US012675729B2

(12) United States Patent
Wu et al.

(10) Patent No.: US 12,675,729 B2
(45) Date of Patent: Jul. 7, 2026

(54) APPARATUS AND METHOD FOR DISTRIBUTED MODEL TRAINING, DEVICE, AND COMPUTER READABLE STORAGE MEDIUM

(71) Applicant: Beijing Baidu Netcom Science and Technology Co., Ltd., Beijing (CN)

(72) Inventors: Zhihua Wu, Beijing (CN); Dianhai Yu, Beijing (CN); Xuefeng Yao, Beijing (CN); Wei Tang, Beijing (CN); Xinxuan Wu, Beijing (CN); Mo Cheng, Beijing (CN); Lin Ma, Beijing (CN); Yanjun Ma, Beijing (CN); Tian Wu, Beijing (CN); Haifeng Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1421 days.

(21) Appl. No.: 17/351,194

(22) Filed: Jun. 17, 2021

(65) Prior Publication Data

US 2021/0326762 A1     Oct. 21, 2021

(30) Foreign Application Priority Data

Dec. 18, 2020     (CN) .......................... 202011502120.3

(51) Int. Cl.
*G06N 20/00*          (2019.01)
*H04L 67/10*          (2022.01)

(52) U.S. Cl.
CPC .............. *G06N 20/00* (2019.01); *H04L 67/10* (2013.01)

(58) Field of Classification Search
CPC ................................. G06N 20/00; H04L 67/10
See application file for complete search history.

(56) References Cited

U.S. PATENT DOCUMENTS

| | | | | |
|---|---|---|---|---|
| 11,275,991 B2 * | 3/2022 | Chang | ..................... | G06N 3/063 |
| 2015/0324690 A1 * | 11/2015 | Chilimbi | ................ | G06N 3/063 |
| | | | | 706/27 |

(Continued)

FOREIGN PATENT DOCUMENTS

| | | |
|---|---|---|
| CN | 107025205 A | 8/2017 |
| CN | 109754060 A | 5/2019 |

(Continued)

OTHER PUBLICATIONS

Dean et al. ("Large Scale Distributed Deep Networks", Google Inc., Mountain View, CA, 2012) (Year: 2012).*

(Continued)

*Primary Examiner* — Imad Kassim
(74) *Attorney, Agent, or Firm* — Weaver Austin Villeneuve & Sampson LLP

(57) ABSTRACT

The present disclosure discloses an apparatus and method for distributedly training a model, an electronic device, and a computer readable storage medium. The apparatus may include: a distributed reader, a distributed trainer and a distributed parameter server that are mutually independent. A reader in the distributed reader is configured to acquire a training sample, and load the acquired training sample to a corresponding trainer in the distributed trainer; the trainer in the distributed trainer is configured to perform model training based on the loaded training sample to obtain gradient information; and a parameter server in the distributed parameter server is configured to update a parameter of an initial model based on the gradient information of the distributed trainer to obtain a trained target model.

16 Claims, 6 Drawing Sheets

300

(56) References Cited

U.S. PATENT DOCUMENTS

| 2017/0083415 A1* | 3/2017 | Reza .................... G06F 11/1469 |
|---|---|---|
| 2018/0331897 A1 | 11/2018 | Zhang et al. |
| 2018/0357541 A1 | 12/2018 | Chen et al. |
| 2019/0325302 A1* | 10/2019 | Savic ........................ G06N 3/08 |
| 2020/0380371 A1* | 12/2020 | Ding ........................ G06N 3/09 |
| 2021/0286650 A1* | 9/2021 | Henry ...................... G06N 3/09 |
| 2022/0044112 A1* | 2/2022 | Zheng ...................... G06N 3/04 |
| 2022/0067577 A1* | 3/2022 | Serebryakov ........... G06N 3/08 |

FOREIGN PATENT DOCUMENTS

| CN | 110414687 A | 11/2019 |
|---|---|---|
| CN | 110502544 A | 11/2019 |
| JP | 2019528512 A | 10/2019 |
| JP | 2020198075 A | 12/2020 |

OTHER PUBLICATIONS

Li et al. ("Distributed machine learning load balancing strategy in cloud computing services", Wireless Networks (2020) 26:5517-5533) (Year: 2020).*

Chinese Office Action dated Aug. 26, 2021 issued in CN Application No. 202011502120.3.

European Search Report dated Jan. 20, 2022 issued in EP Application No. 21179147.0.

Zheng et al., "ShadowSync: Performing Synchronization in the Background for Highly Scalable Distributed Training," arxiv.org, Cornell University Library, Mar. 7, 2020 , XP081616993, 18 pages.

* cited by examiner

200

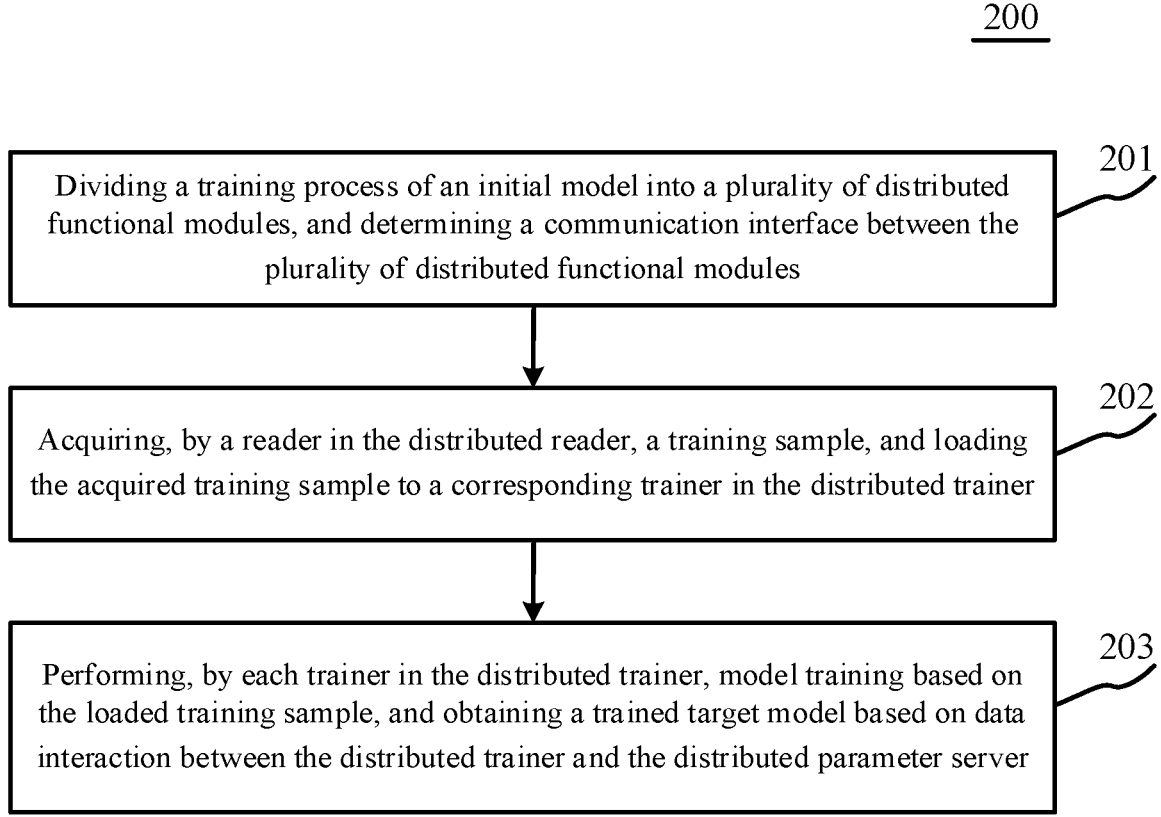

Dividing a training process of an initial model into a plurality of distributed functional modules, and determining a communication interface between the plurality of distributed functional modules

201

Acquiring, by a reader in the distributed reader, a training sample, and loading the acquired training sample to a corresponding trainer in the distributed trainer

202

Performing, by each trainer in the distributed trainer, model training based on the loaded training sample, and obtaining a trained target model based on data interaction between the distributed trainer and the distributed parameter server

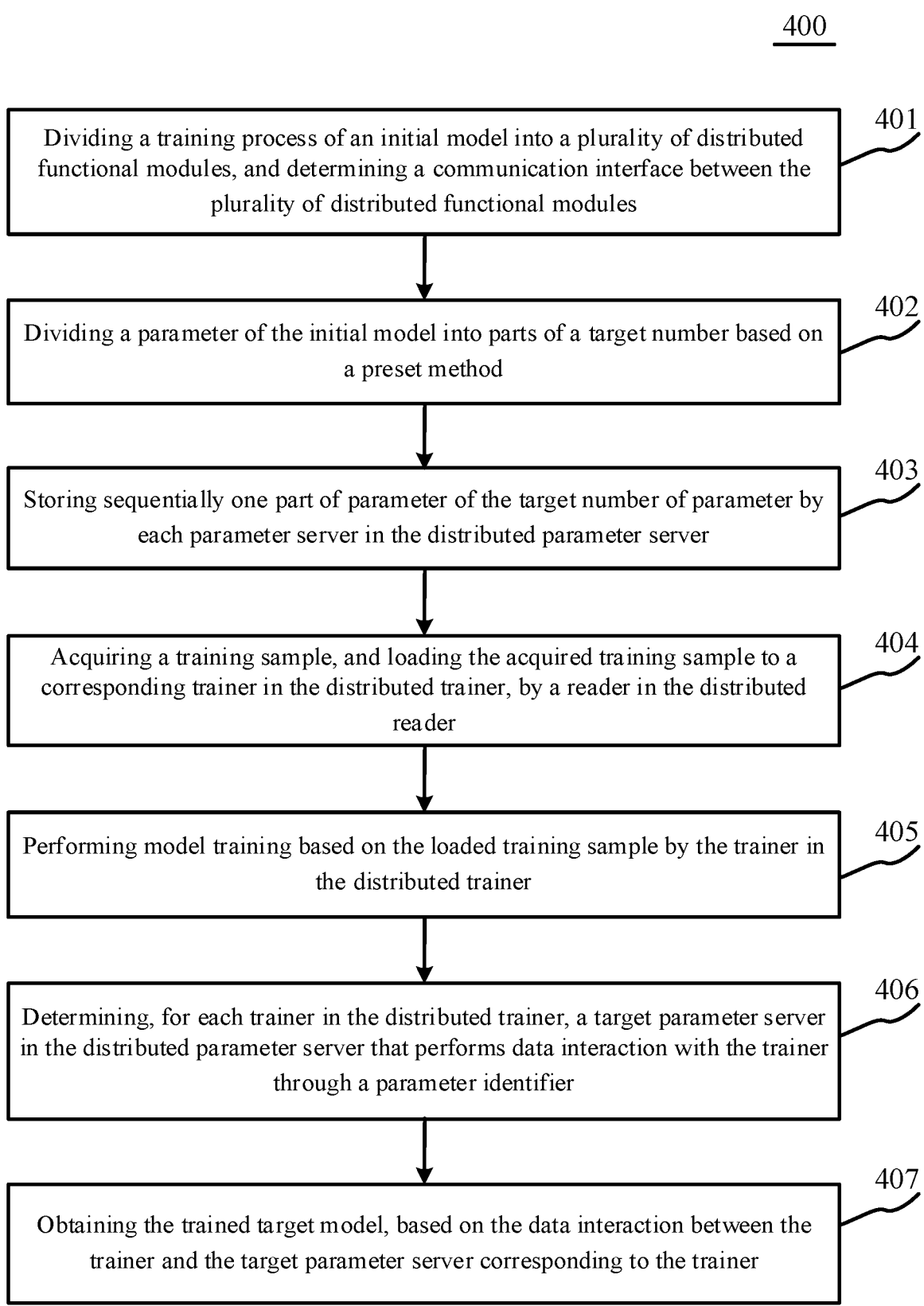

Dividing a training process of an initial model into a plurality of distributed functional modules, and determining a communication interface between the plurality of distributed functional modules
401

Dividing a parameter of the initial model into parts of a target number based on a preset method
402

Storing sequentially one part of parameter of the target number of parameter by each parameter server in the distributed parameter server
403

Acquiring a training sample, and loading the acquired training sample to a corresponding trainer in the distributed trainer, by a reader in the distributed reader
404

Performing model training based on the loaded training sample by the trainer in the distributed trainer
405

Determining, for each trainer in the distributed trainer, a target parameter server in the distributed parameter server that performs data interaction with the trainer through a parameter identifier
406

Obtaining the trained target model, based on the data interaction between the trainer and the target parameter server corresponding to the trainer
407

APPARATUS AND METHOD FOR DISTRIBUTED MODEL TRAINING, DEVICE, AND COMPUTER READABLE STORAGE MEDIUM

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates to the technical field of computer technology, in particular to the field of deep learning technology, and more particular to an apparatus and method for distributedly training a model, an electronic device, and a computer readable storage medium.

BACKGROUND

With the promotion of the wave of big data and the rapid development of deep learning technology, the data scale and the model scale that are involved in deep learning grow tremendously. The dual challenge of big data and big model is an unbearable burden for stand-alone training. Thus, it is necessary to use a data-parallel distributed training mode to meet business requirements. At present, a decentralized distributed training mode and a centralized distributed training mode are generally adopted.

SUMMARY

Embodiments of the present disclosure propose an apparatus and method for distributedly training a model, an electronic device, and a computer readable storage medium.

According to a first aspect, an embodiment of the present disclosure provides an apparatus for distributedly training a model, including: a distributed reader, a distributed trainer and a distributed parameter server that are mutually independent. A reader in the distributed reader is configured to acquire a training sample, and load the acquired training sample to a corresponding trainer in the distributed trainer; the trainer in the distributed trainer is configured to perform model training based on the loaded training sample to obtain gradient information; and a parameter server in the distributed parameter server is configured to update a parameter of an initial model based on the gradient information of the distributed trainer to obtain a trained target model.

According to a second aspect, an embodiment of the present disclosure provides a method for distributedly training a model, including: dividing a training process of an initial model into a plurality of distributed functional modules, and determining a communication interface between the plurality of distributed functional modules, wherein the plurality of distributed functional modules are independent of each other, and comprise a distributed reader, a distributed trainer and a distributed parameter server; acquiring, by a reader in the distributed reader, a training sample, and loading the acquired training sample to a corresponding trainer in the distributed trainer; and performing, by the trainer in the distributed trainer, model training based on the loaded training sample, and obtaining a trained target model based on data interaction between the distributed trainer and the distributed parameter server.

According to a third aspect, an embodiment of the present disclosure provides an electronic device, including: at least one processor; and a memory, communicatively connected to the at least one processor. The memory stores instructions executable by the at least one processor, the instructions, when executed by the at least one processor, cause the at least one processor to perform the method according to the second aspect.

According to a fourth aspect, an embodiment of the present disclosure provides a non-transitory computer readable storage medium storing computer instructions. The computer instructions, being used to cause a computer to perform the method according to the second aspect.

In the apparatus and method for distributedly training a model, the electronic device, and the computer readable storage medium provided by embodiments of the present disclosure, the apparatus includes a distributed reader, a distributed trainer and a distributed parameter server mutually independent. Where a reader in the distributed reader is configured to acquire a training sample, and load the acquired training sample to a corresponding trainer in the distributed trainer; the trainer in the distributed trainer is configured to perform model training based on the loaded training sample to obtain gradient information; and a parameter server in the distributed parameter server is configured to update a parameter of an initial model based on the gradient information of the distributed trainer to obtain a trained target model.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

By reading detailed description of non-limiting embodiments with reference to following accompanying drawings, other features, objectives and advantages of the present disclosure will become more apparent.

FIG. 2 is a flowchart of a method for distributedly training a model according to an embodiment of the present disclosure;

FIG. 4 is a flowchart of the method for distributedly training a model according to another embodiment of the present disclosure;

DETAILED DESCRIPTION OF EMBODIMENTS

The following describes example embodiments of the present disclosure with reference to the accompanying drawings, which include various details of the embodiments of the present disclosure to facilitate understanding, and should be regarded as merely examples. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description. It should be noted that the embodiments and features in the embodiments in the present disclosure may be combined with each other on a non-conflict basis.

Figure 1:
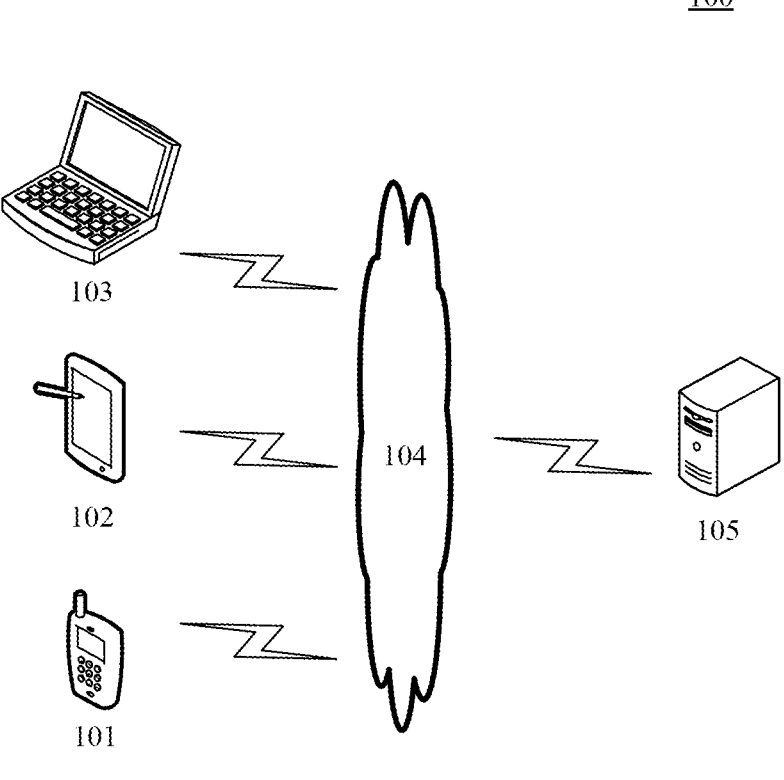
FIG. 1 is an example system architecture diagram to which an embodiment of the present disclosure may be implemented.

FIG. 1 shows an example architecture 100 to which a method and apparatus for distributedly training a model of the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optical fibers.

The terminal devices 101, 102, and 103 may be hardware devices or software that support network connection for information interaction and data processing. When the terminal devices 101, 102, 103 are hardware, they may be various electronic devices that support network connection, information interaction, display, processing and other functions, including but not limited to smart phones, tablet computers, car computers, laptops computers and desktop computers, etc. When the terminal devices 101, 102, and 103 are software, they may be installed in the electronic devices listed above. They may be implemented as, for example, a plurality of pieces of software or a plurality of software modules for providing distributed services, or as a single piece of software or a single software module, which is not limited herein.

The server 105 may be a server that provides various services, for example, a backend processing server that acquires gradient information calculated by the terminal devices 101, 102, and 103 and updates a model parameter. For example, the server 105 may be a cloud server.

It should be noted that the server may be hardware or software. When the server is hardware, it may be implemented as a distributed server cluster composed of a plurality of servers, or as a single server. When the server is software, it may be implemented as a plurality of pieces of software or a plurality of software modules (for example, software or software modules used to provide distributed services), or as a single piece of software or a single software module, which is not limited herein.

It should also be noted that the method for distributedly training a model provided by embodiments of the present disclosure may be performed by the server, or by the terminal devices, or may be performed by the server and the terminal devices in cooperation with each other. Correspondingly, parts (for example, units, modules) included in the apparatus for distributedly training a model may be all set in the server, also be all set in the terminal devices, or they may be set in the server and the terminal devices respectively.

It should be understood that the numbers of terminal devices, networks, and servers in FIG. 1 are merely illustrative. Depending on the implementation needs, there may be any number of terminal devices, networks, and servers. When an electronic device on which the method for distributedly training a model runs does not need to transmit data with other electronic devices, the system architecture may only include the electronic device on which the method for distributedly training a model runs (such as the server or the terminal devices).

With further reference to FIG. 2, illustrating a flow 200 of an embodiment of a method for distributedly training a model, including the following steps.

Step 201, dividing a training process of an initial model into a plurality of distributed functional modules, and determining a communication interface between the plurality of distributed functional modules.

In the present embodiment, an executing body (for example, the server in FIG. 1) of the method for distributedly training a model may divide the training process of the initial model into the plurality of distributed functional modules based on functionalities involved in the training process of the initial model, and determine the communication interface(s) between the plurality of distributed functional modules.

In general, the training process of the initial model may involve a data acquiring functionality, a training functionality, and a parameter update functionality. Here, the data acquiring functionality represents acquiring of a training sample; the training functionality represents performing model training based on the acquired training sample, and obtaining corresponding gradient information through a forward propagation calculation process and a back propagation calculation process; and the parameter update functionality is used to update a parameter of the initial model based on the gradient information. Based on the above functionalities, the executing body divides the training process of the initial model into a distributed reader, a distributed trainer, and a distributed parameter server.

The distributed reader, the distributed trainer and the distributed parameter server are independent of each other, and data interaction is performed through the unified communication interface. For example, a data communication interface having a functionality of transmitting a training sample is set between the distributed reader and the distributed trainer; and a data communication interface having a functionality of transmitting gradient information and parameter information is set between the distributed trainer and the distributed parameter server. It may be understood that the distributed reader may include a plurality of readers, the distributed trainer may include a plurality of trainers, and the distributed parameter server may include a plurality of parameter servers.

In some alternative implementations of the present embodiment, the executing body separates the parameter processing functionality of each trainer in the distributed trainer into a distributed parameter processor, and separates the data interaction functionality of the parameters and gradients between the distributed trainer and the distributed parameter server into a distributed communicator. That is, the plurality of distributed functional modules further include: the distributed parameter processor and the distributed communicator. Each parameter processor in the distributed parameter processor is configured to send, receive and aggregate a parameter and a gradient in the distributed trainer. As an example, each trainer in the distributed trainer corresponds to a parameter processor in the distributed parameter processor, and the parameter processor is configured to send, receive and aggregate the parameter and the gradient in the corresponding trainer. As another example, the parameter processor may perform one-time gradient aggregation for training a preset number and batch of training samples based on an operation instruction of a user. The preset number and the number of training samples each batch may be set according to actual conditions. For example, the preset number may be 1, and the number of training samples each batch may be 32.

Each communicator in the distributed communicator is configured to perform data interaction on parameters and gradients between the distributed trainer and the distributed parameter server. For example, each trainer may perform data interaction with the corresponding parameter server through a communicator. The distributed communicator may be implemented by fleetWrapper, for example.

The distributed communicator may further perform global shuffle of the training sample in the distributed trainer. FleetWrapper defines a communication capability between trainers, which may realize global shuffle. In addition, the distributed communicator may provide a request interface for necessary functionalities of large-scale distributed training, such as admission, elimination, attenuation and preservation of a sparse parameter.

In some alternative implementations of the present embodiment, the plurality of distributed functional modules further include: a leakage interface module. The leakage interface module provides an interface for interacting with a user. In this implementation, the leakage interface module may be implemented through FleetAPI.

Step 202, acquiring, by a reader in the distributed reader, a training sample, and loading the acquired training sample to a corresponding trainer in the distributed trainer.

In the present embodiment, the executing body may acquire the training sample, and load the acquired training sample to the corresponding trainer in the distributed trainer by each reader in the distributed reader.

For example, there is a one-to-one corresponding relationship between the plurality of readers in the distributed reader and the plurality of trainers in the distributed trainer. For each reader in the distributed reader, the acquired training sample is loaded to the trainer corresponding to the reader. In order to meet training needs of high-speed running models, the distributed reader may have a built-in DataSet API (Application Programming Interface) for high-performance data input and output operations to improve an acquisition speed of training samples during model training.

In some alternative implementations of the present embodiment, the reader in the distributed reader and the corresponding trainer in the distributed trainer perform data interaction in a multi-threaded fully asynchronous approach. It may be understood that a transmission rate of training samples between the reader and the trainer may be improved in the multi-threaded fully asynchronous approach, so that a training rate of the initial model may be improved.

In some alternative implementations of the present embodiment, each reader in the distributed reader has a plurality of reading threads, each reading thread acquires a training sample. For each reader in the distributed reader, each reading thread in the reader acquires a training sample respectively, and loads the acquired training sample to an information queue corresponding to each reading thread, so that each training thread of the trainer corresponding to the reader acquires the training sample from the corresponding information queue. Each information queue may be set in the trainer. This implementation provides a specific multi-threaded fully asynchronous data interaction approach. Using the information queue, the training rate of the initial model may be further improved.

Step 203, performing, by each trainer in the distributed trainer, model training based on the loaded training sample, and obtaining a trained target model based on data interaction between the distributed trainer and the distributed parameter server.

In the present embodiment, the executing body may perform model training based on the loaded training sample, and obtain the trained target model based on the data interaction between the distributed trainer and the distributed parameter server by the trainer in the distributed trainer.

In the model training process of the trainer in the distributed trainer, by sending, receiving, and aggregating the parameter and the gradient in the distributed trainer through the parameter processor in the distributed parameter processor; and performing data interaction on the parameters and gradients between the distributed trainer and the distributed parameter server through the communicator in the distributed communicator, and the trained target model is obtained based on the data interaction.

For example, each time the parameter processor in the distributed parameter processor obtains the aggregated gradient information, the parameter processor transmits the gradient information to the distributed parameter server through the distributed communicator; the distributed parameter server updates the parameter of the initial model after obtaining the gradient information. After multiple parameter updates, in response to reaching a preset end condition, the trained target model is obtained. The preset end condition is used to represent completion of training of the initial model. For example, the preset end condition may be that the number of times of training reaches a preset time threshold, training time reaches a preset time threshold, or a loss converges to minimum. Before reaching the preset end condition, the executing body has been training the initial model based on the training sample.

In the present embodiment, in response to the completion of training of the initial model, the trained target model is obtained. Inputting input data into a pre-trained target model, corresponding output data may be obtained. For example, when the trained target model is a model for face recognition, an image including a face object is input into the pre-trained target model to obtain a corresponding face recognition result; when the trained target model is a model for image classification, an input image is input into the pre-trained target model to obtain a corresponding image classification result; and when the trained target model is a model for speech recognition, speech data is input into the pre-trained target model to obtain a corresponding speech recognition result.

Figure 3:
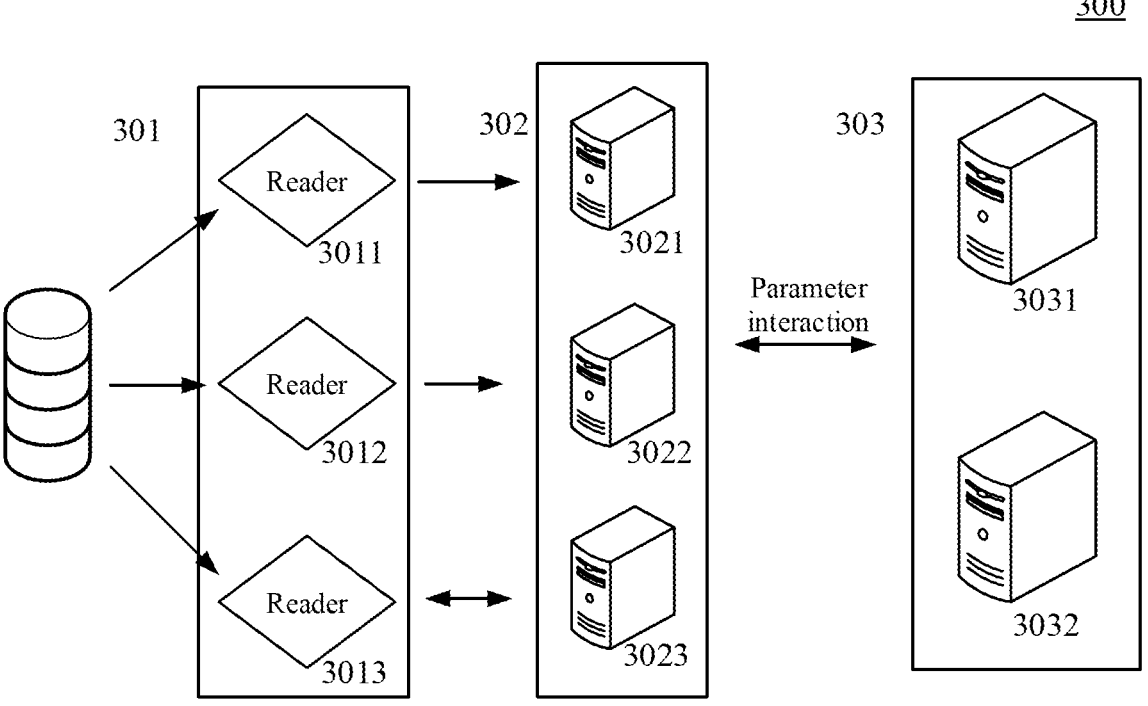
FIG. 3 is a schematic diagram of an application scenario of the method for distributedly training a model according to an embodiment of the present disclosure.

With further reference to FIG. 3, FIG. 3 is a schematic diagram of an application scenario of the method for distributedly training a model according to the present embodiment. In the application scenario of FIG. 3, an initial model is a deep learning model for image classification. Before training the initial model, based on functionalities involved in a training process of the initial model, the training process of the initial model is first divided into a plurality of distributed functional modules, and a communication interface between the plurality of distributed functional modules is determined. The plurality of distributed functional modules are independent of each other, including a distributed reader 301, a distributed trainer 302, and a distributed parameter server 303. The distributed reader 301 includes readers 3011, 3012, and 3013, the distributed trainer 302 includes trainers 3021, 3022, 3023, and the distributed parameter server 303 includes parameter servers 3031, 3032. Acquiring training samples through the readers 3011, 3012, and 3013 in the distributed reader, and the acquired training samples are loaded to the corresponding trainers 3021, 3022, 3023 in the distributed trainer. Through each trainer in the distributed trainer, model training is performed based on the loaded training samples, and based on parameter interaction between the distributed trainer and the parameter servers 3031 and 3032 in the distributed parameter server, a trained target model is obtained.

The present embodiment provides a method for distributedly training a model. In the model training process, the respective modules are independent of each other and run in cooperation, which improves a model training speed.

In some alternative implementations of the present embodiment, for an initial model with a relatively large parameter scale, the executing body may divide the parameter of the initial model into parts of a target number based on a preset method. The target number represents the number of parameter servers in the distributed parameter server; and each parameter server in the distributed parameter server sequentially stores one part of parameter of the target number of parameter.

For example, each parameter is correspondingly provided with a parameter identifier represented by a number, and by performing a modulo operation based on a value represented by the target number on the parameter identifier, the parameter of the initial model may be divided into parts of the target number. In this implementation, each parameter server in the distributed parameter server correspondingly stores the parts of the target number of parameter, so that the present disclosure is suitable for scenarios with a large model parameter scale, which expands an application scope of the present disclosure.

In some alternative implementations of the present embodiment, determining, for each trainer in the distributed trainer, a target parameter server in the distributed parameter server that performs parameter interaction with the trainer through a parameter identifier; and obtaining the trained target model, based on the parameter interaction between the trainer and the target parameter server corresponding to the trainer.

In this implementation, the trainer in the distributed trainer corresponds to the parameter server in the distributed parameter server, and the trainer in the distributed trainer is responsible for the training and update of the parameter in the corresponding parameter server, which further improves the model training speed.

In some alternative implementations of the present embodiment, in the model training process, the executing body adjusts computing power between the trainers based on a load balancing strategy to match the computing power of the trainers.

The matching of computing power is used to represent matching of a load status between the trainers. In this way, the trainers are all in a status of full load, reaching a best running status between the trainers, avoiding existence of idle trainers in the trainers, thereby improving the model training speed and a utilization rate of the trainer.

With further reference to FIG. 4, illustrating a schematic flow 400 of the method for distributedly training a model according to another embodiment of the present disclosure, including the following steps.

Step 401, dividing a training process of an initial model into a plurality of distributed functional modules, and determining a communication interface between the plurality of distributed functional modules.

The plurality of distributed functional modules are independent of each other, including a distributed reader, a distributed trainer and a distributed parameter server.

Step 402, dividing a parameter of the initial model into parts of a target number based on a preset method.

The target number represents the number of parameter servers in the distributed parameter server.

Step 403, storing sequentially one part of parameter of the target number of parameter by each parameter server in the distributed parameter server.

Step 404, acquiring a training sample, and loading the acquired training sample to a corresponding trainer in the distributed trainer, by a reader in the distributed reader.

Step 405, performing model training based on the loaded training sample by the trainer in the distributed trainer.

Step 406, determining, for each trainer in the distributed trainer, a target parameter server in the distributed parameter server that performs data interaction with the trainer through a parameter identifier.

Step 407, obtaining the trained target model, based on the data interaction between the trainer and the target parameter server corresponding to the trainer.

In the present embodiment, it can be seen from FIG. 4 that compared with the embodiment corresponding to FIG. 2, the flow 400 of the method for distributedly training a model in the present embodiment highlights that the parameter server in the distributed parameter server correspondingly stores part of the parameter of the initial model, and completes the training of the initial model through the data interaction with the trainer in the distributed trainer. In this way, the present embodiment further improves the model training speed and the application scope of the present disclosure.

Figure 5:
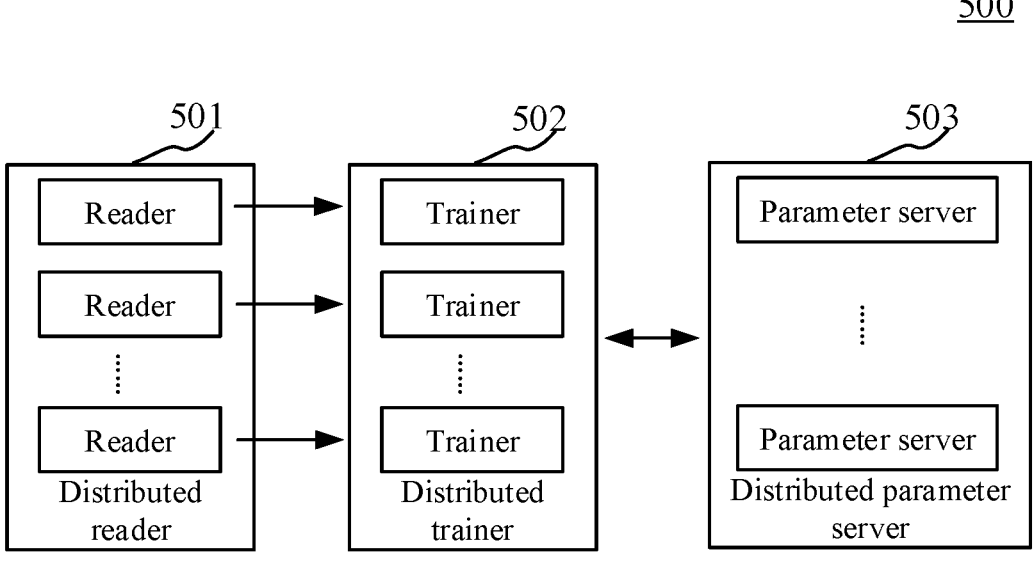
FIG. 5 is a flowchart of an apparatus for distributedly training a model in coordination according to an embodiment of the present disclosure.

With further reference to FIG. 5, as an implementation of the method shown in the above FIG. 2, an embodiment of the present disclosure provides an apparatus for distributedly training a model. The apparatus embodiment corresponds to the method embodiment shown in FIG. 2. In addition to the features described below, the apparatus embodiment may also include the same or corresponding features as the method embodiment shown in FIG. 2 and produce the same or corresponding effects as the method embodiment shown in FIG. 2. The apparatus may be applied to various electronic devices.

As shown in FIG. 5, the apparatus for distributedly training a model of the present embodiment, includes: a distributed reader 501, a distributed trainer 502 and a distributed parameter server 503 that are mutually independent. The distributed reader 501 includes a plurality of readers, the distributed trainer 502 includes a plurality of trainers, and the distributed parameter server 503 includes a plurality of parameter servers. A reader in the distributed reader 501 is configured to acquire a training sample, and load the acquired training sample to a corresponding trainer in the distributed trainer 502. The trainer in the distributed trainer 502 is configured to perform model training based on the loaded training sample to obtain gradient information. A parameter server in the distributed parameter server 503 is configured to update a parameter of an initial model based on the gradient information of the distributed trainer 502 to obtain a trained target model.

In some alternative implementations of the present embodiment, the apparatus further includes: a distributed parameter processor (not shown in the figure) and a distributed communicator (not shown in the figure). A parameter processor in the distributed parameter processor is configured to send, receive, and aggregate a parameter and a gradient in the distributed trainer; and a communicator in the distributed communicator is configured to perform data interaction on parameters and gradients between the distributed trainer and the distributed parameter server.

In some alternative implementations of the present embodiment, the reader in the distributed reader 501 and the corresponding trainer in the distributed trainer 502 perform data interaction in a multi-threaded fully asynchronous approach.

In some alternative implementations of the present embodiment, each reading thread in the reader in the distributed reader 501 acquires a training sample respectively, and loads the acquired training sample to an information queue corresponding to each reading thread, so that each training thread of the trainer corresponding to the reader acquires the training sample from the corresponding information queue.

In some alternative implementations of the present embodiment, the parameter of the initial model is divided into parts of a target number based on a preset method, where the target number represents the number of parameter servers in the distributed parameter server 503; and each parameter server in the distributed parameter server sequentially stores one part of parameter of the target number of parameter.

In some alternative implementations of the present embodiment, the trainer in the distributed trainer 502 is further configured to determine a target parameter server in the distributed parameter server 503 that performs data interaction with the trainer through a parameter identifier; and the communicator in the distributed communicator is further configured to perform data interaction between the trainer in the distributed trainer and the target parameter server corresponding to the trainer.

In some alternative implementations of the present embodiment, the apparatus further includes: a leakage interface module (not shown in the figure). The leakage interface module is configured to provide an interface for interacting with a user.

The present embodiment provides an apparatus for distributedly training a model. In the model training process, the modules are independent of each other and run in cooperation, improving a model training speed.

According to the present disclosure, embodiments of the present disclosure further provides an electronic device, a readable storage medium and a computer program product.

Figure 6:
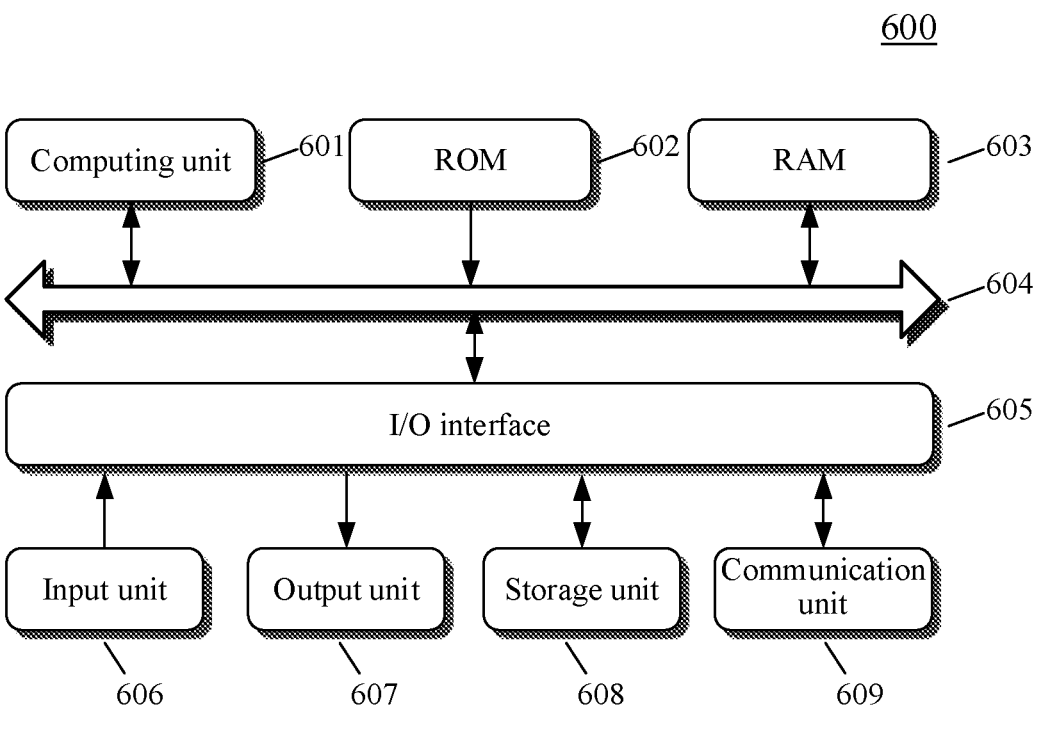
FIG. 6 is a schematic structural diagram of a computer system suitable for implementing an electronic device/terminal device or a server of an embodiment of the present disclosure.

FIG. 6 shows a schematic block diagram of an example electronic device 600 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functionalities are merely examples, and are not intended to limit the implementation of the present disclosure described and/or claimed herein.

As shown in FIG. 6, the device 600 includes a computing unit 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the device 600. The computing unit 601, the ROM 602 and the RAM 603 are connected to each other through a bus 604. An input/output (I/O) interface 605 is also connected to the bus 604.

A plurality of components in the device 600 are connected to the I/O interface 605, including: an input unit 606 such as a keyboard, a mouse, etc.; an output unit 607 such as a displayer of various types, a speaker, etc.; a storage unit 608 such as a disk, a CD and the like; and a communication unit 609 such as a network interface card, a modulator-demodulator, and a wireless transceiver, and the like. The communication unit 609 allows the device 600 to exchange information/data with other devices through a computer network such as the Internet and/or various telecommunication networks.

The computing unit 601 may be various general-purpose and/or dedicated processing components having processing and computing capabilities. Some examples of the computing unit 601 include, but are not limited to, central processing unit (CPU), graphics processing unit (GPU), various dedicated artificial intelligence (AI) computing chips, various computing units running machine learning model algorithms, digital signal processor (DSP), and any appropriate processors, controllers, microcontrollers, etc. The computing unit 601 performs the various methods and processes described above, such as the method for distributedly training a model. For example, in some embodiments, the method for distributedly training a model may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computing unit 601, one or more steps of the method for distributedly training a model described above may be performed. Alternatively, in other embodiments, the computing unit 601 may be configured to perform the method for distributedly training a model by any other appropriate means (for example, by means of firmware).

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The program codes for carrying out the method of the present disclosure may be written in any combination of one or more programming languages. These program codes may be provided to a processor or controller of a general purpose computer, special purpose computer, or other programmable data processing apparatus such that the program codes, when executed by the processor or controller, cause the functionalities/operations specified in the flowchart and/or block diagram to be implemented. The program codes may be executed entirely on the machine, partly on the machine, partly on the machine as a stand-alone software package and partly on the remote machine or entirely on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor system, apparatus, or device, or any suitable combination of the foregoing. More specific examples of machine-readable storage media may include one or more line-based electrical connections, a portable computer disk, a hard disk, a random access memory (RAM), a read-only memory (ROM), an erasable programmable read-only memory (EPROM or flash memory), an optical fibers, portable compact disk read-only memory (CD-ROM), an optical storage device, a magnetic storage devices, or any suitable combination of the foregoing.

To provide interaction with a user, the systems and techniques described herein may be implemented on a computer having a display apparatus (e.g., a CRT (cathode ray tube) or LCD (liquid crystal display) monitor) for displaying information to the user; and a keyboard and a pointing apparatus (e.g., a mouse or a trackball) through which a user can provide input to a computer. Other types of apparatus may also be used to provide interaction with a user. For example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with implementations of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other. The server may be a cloud server, which is also referred to as a cloud computing server or a cloud host, and is a host product in a cloud computing service system, so as to solve a defect that a conventional physical host and a VPS (Virtual Private Server) service are difficult to manage and have weak service scalability.

According to the technical solution of the embodiments of the present disclosure, a method for distributedly training a model is provided. In the model training process, the modules are independent of each other and run in cooperation, which improves a model training speed.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. An apparatus for distributed training of a model, the apparatus comprising a distributed reader, a distributed trainer, and a distributed parameter server that are mutually independent, wherein:
    a reader in the distributed reader is configured to acquire a training sample, and load the acquired training sample to a corresponding trainer in the distributed trainer;
    the trainer in the distributed trainer is configured to perform model training based on the loaded training sample to obtain gradient information, wherein the distributed trainer comprises a plurality of trainers, and in a model training process, computing powers of the plurality of trainers match loads of the plurality of trainers by adjusting the computing powers of the plurality of trainers based on a load balancing strategy, wherein the plurality of trainers are all in a status of full load by matching the computing powers of the plurality of trainers;
    a parameter server in the distributed parameter server is configured to update a parameter of an initial model based on the gradient information of the distributed trainer to obtain a trained target model; and
    the apparatus further comprises a communicator unit configured to perform data interaction on parameters and gradients between the distributed trainer and the distributed parameter server, wherein the communicator unit is further configured to perform global shuffle of the training sample in the distributed trainer.

2. The apparatus according to claim 1, further comprising a distributed parameter processor, wherein:
    a parameter processor in the distributed parameter processor is configured to send, receive, and aggregate a parameter and a gradient in the distributed trainer.

3. The apparatus according to claim 1, wherein the reader in the distributed reader and the corresponding trainer in the distributed trainer perform data interaction in a multi-threaded fully asynchronous approach.

4. The apparatus according to claim 3, wherein each reading thread in the reader in the distributed reader acquires a training sample respectively, and loads the acquired training sample to an information queue corresponding to each reading thread, so that each training thread of the trainer corresponding to the reader acquires the training sample from the corresponding information queue.

5. The apparatus according to claim 1, wherein:
    parameters of the initial model are divided into a target number of sets of parameters based on a preset method, wherein the target number represents a number of parameter servers in the distributed parameter server; and
    each parameter server in the distributed parameter server is configured to store a respective set of parameters of the target number of sets of parameters.

6. The apparatus according to claim 5, wherein:

the trainer in the distributed trainer is further configured to determine a target parameter server in the distributed parameter server that performs data interaction with the trainer through a parameter identifier; and the communicator unit is further configured to perform data interaction between the trainer in the distributed trainer and the target parameter server corresponding to the trainer.

7. The apparatus according to claim 5, wherein each parameter is associated with a corresponding parameter identifier represented by a number, and the parameters of the initial model are divided into the target number of sets of parameters by performing a modulo operation on the corresponding parameter identifier based on a value represented by the target number.

8. The apparatus according to claim 1, further comprising a non-transitory machine-readable medium, wherein the non-transitory machine-readable medium stores instructions executable to provide an interface for interacting with a user.

9. A method for distributed training of a model, the method comprising:

dividing a training process of an initial model into a plurality of distributed functional modules, and determining a communication interface between the plurality of distributed functional modules, wherein the plurality of distributed functional modules are independent of each other, and comprise a distributed reader, a distributed trainer and a distributed parameter server;

acquiring, by a reader in the distributed reader, a training sample, and loading the acquired training sample to a corresponding trainer in the distributed trainer; and performing, by the trainer in the distributed trainer, model training based on the loaded training sample, and obtaining a trained target model based on data interaction between the distributed trainer and the distributed parameter server, wherein the distributed trainer comprises a plurality of trainers, and in a model training process, computing powers of the plurality of trainers match loads of the plurality of trainers by adjusting the computing powers of the trainers based on a load balancing strategy, wherein the plurality of trainers are all in a status of full load by matching the computing powers of the plurality of trainers and wherein the plurality of distributed functional modules comprises a communicator unit, and performing the model training comprises performing, by the communicator unit, data interaction on parameters and gradients between the distributed trainer and the distributed parameter server, and performing, by the communicator unit, global shuffle of the training sample in the distributed trainer.

10. The method according to claim 9, wherein:

the plurality of distributed functional modules further comprises a distributed parameter processor; and the performing, by the trainer in the distributed trainer, model training based on the loaded training sample, and obtaining a trained target model based on data interaction between the distributed trainer and the distributed parameter server, comprise:

sending, receiving, and aggregating a parameter and a gradient in the distributed trainer through a parameter processor in the distributed parameter processor, in a model training process of the trainer in the distributed trainer.

11. The method according to claim 9, wherein the reader in the distributed reader and the corresponding trainer in the distributed trainer perform data interaction in a multi-threaded fully asynchronous approach.

12. The method according to claim 11, wherein the acquiring, by a reader in the distributed reader, a training sample, and loading the acquired training sample to a corresponding trainer in the distributed trainer comprise:

for each reader in the distributed reader, acquiring, by each reading thread in the reader, a training sample respectively, and loading the acquired training sample to an information queue corresponding to each reading thread, so that each training thread of the trainer corresponding to the reader acquires the training sample from the corresponding information queue.

13. The method according to claim 9, further comprising:

dividing parameters of the initial model into a target number of sets of parameters based on a preset method, wherein the target number represents a number of parameter servers in the distributed parameter server; and storing, by each parameter server in the distributed parameter server, a respective set of parameters of the target number of sets of parameters.

14. The method according to claim 13, wherein the obtaining a trained target model based on data interaction between the distributed trainer and the distributed parameter server comprises:

for each trainer in the distributed trainer, determining a target parameter server in the distributed parameter server that performs data interaction with the trainer through a parameter identifier; and obtaining the trained target model, based on the data interaction between the trainer and the target parameter server corresponding to the trainer.

15. An electronic device, comprising:

at least one processor; and a memory communicatively connected to the at least one processor, wherein the memory stores instructions executable by the at least one processor, the instructions, when executed by the at least one processor, causing the at least one processor to perform the method according to claim 9.

16. A non-transitory computer readable storage medium storing computer instructions, the computer instructions being used to cause a computer to perform the method according to claim 9.

\* \* \* \* \*